United States Patent [19]
Rosen et al.

[11] Patent Number: 5,832,291
[45] Date of Patent: Nov. 3, 1998

[54] DATA PROCESSOR WITH DYNAMIC AND SELECTABLE INTERCONNECTIONS BETWEEN PROCESSOR ARRAY, EXTERNAL MEMORY AND I/O PORTS

[75] Inventors: Philip G. Rosen, El Segundo; Krzysztof W. Przytula, Santa Monica; David A. Schwartz, Moorpark, all of Calif.

[73] Assignee: Raytheon Company, Lexington, Mass.

[21] Appl. No.: 572,932

[22] Filed: Dec. 15, 1995

[51] Int. Cl.⁶ .................................................. G06F 13/00
[52] U.S. Cl. ................... 395/800.11; 395/800.14; 395/800.18; 364/243; 364/245.7; 364/254.4; 364/DIG. 1
[58] Field of Search ............................. 395/800, 800.11, 395/800.14, 800.18; 364/DIG. 1, 243, 245.7, 254.4

[56] References Cited

U.S. PATENT DOCUMENTS

| | | | |
|---|---|---|---|
| 4,513,367 | 4/1985 | Chan et al. | 364/200 |
| 4,885,680 | 12/1989 | Anthony et al. | 364/200 |
| 5,396,641 | 3/1995 | Iobst et al. | 395/800 |
| 5,408,671 | 4/1995 | Tanaka | 385/800 |
| 5,577,262 | 11/1996 | Pechanek et al. | 395/800 |
| 5,598,408 | 1/1997 | Nickolls et al. | 370/351 |
| 5,617,577 | 4/1997 | Barker et al. | 395/800 |

OTHER PUBLICATIONS

"The Distributed Array of Processors (DAP)," Parallel Supercomputing in SIMD Architectures, Chapter 5, pp. 143–164, 1990, CRC Press Inc.

Primary Examiner—Alyssa H. Bowler
Assistant Examiner—Dzung C. Nguyen
Attorney, Agent, or Firm—Leonard A. Alkov; Glenn H. Lenzen, Jr.

[57] ABSTRACT

A data processor intended for a single instruction, multiple data mode operation includes memory that is external to the processor array, and a controller that dynamically and selectably interconnects multiple edges of the processor array with the memory and with I/O ports. A separate controller module is provided for each memory channel, and interconnects with corresponding edge processing elements of the processor array. The controller modules for the different channels are independent of each other, as are the channel memories. In the case of a rectangular processor array, each channel memory can be implemented with only three memory stores that are interconnected with the four edges of the processing array and the I/O ports through the channel controller module, yet for most algorithms provide a throughput that is comparable to that resulting from the use of four memory stores.

22 Claims, 5 Drawing Sheets

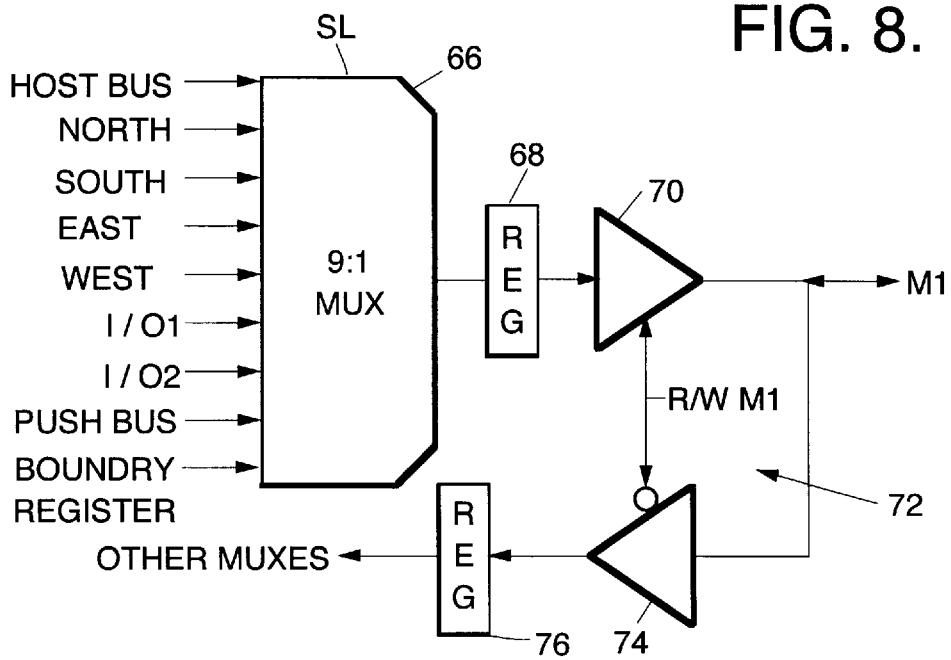
FIG. 8.
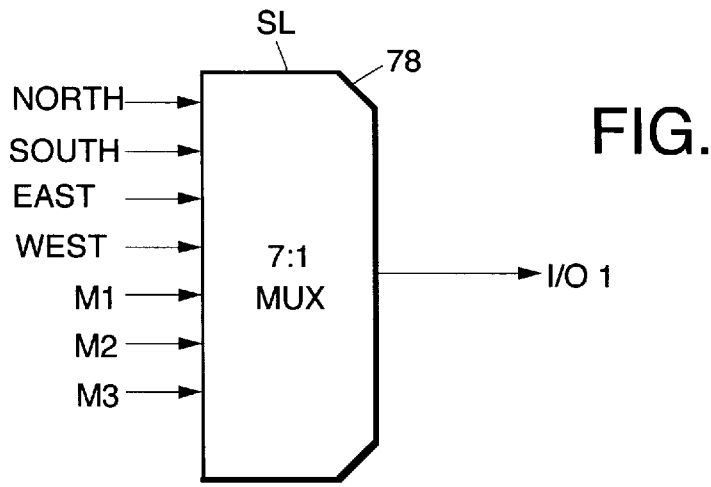
FIG. 9.
FIG. 11.
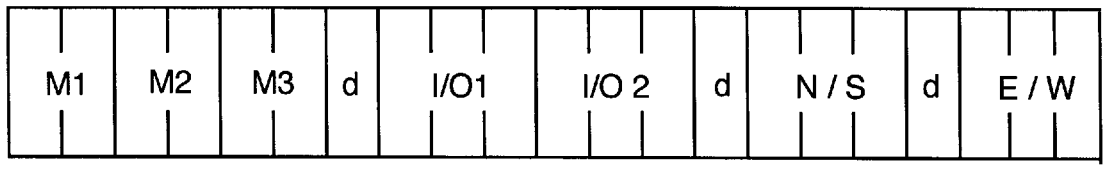

DATA PROCESSOR WITH DYNAMIC AND SELECTABLE INTERCONNECTIONS BETWEEN PROCESSOR ARRAY, EXTERNAL MEMORY AND I/O PORTS

BACKGROUND OF THE INVENTION

1. Field of the Invention

This invention relates to data processor architectures, and more particularly to an interconnection architecture for a single instruction, multiple data mode data processor with memory and input/output (I/O) external to a processor array.

2. Description of the Related Art

Data processors which operate in a single instruction, multiple data mode employ multiple processing elements (PEs) that are typically arranged in a regular structure such as a linear array, a 2-D array by row and columns, or a hypercube. Such processors are discussed in "The Distributed Array of Processors (DAP)", Parallel Supercomputing in SIMD Architectures, Chapter 5, pages 143–164, 1990, CRC Press Inc. Each PE is typically directly connected to a local memory. If the PE is a very simple 1-bit processor, there are typically many PEs per integrated circuit chip, each with a direct 1-bit interconnection to memory. If the PE is more complex, such as a 32-bit processor, there is typically one PE per integrated circuit chip, with a single 32-bit interconnection to memory. If many simple, or several complex PEs are integrated on a single chip, the number of practical I/O pins on chip that can be used to connect the PEs to memory limits the bandwidth of the interconnect between the PEs and the memory. If the problem being processed does not exhibit good spatial locality within the limited on chip PE memory, processor performance is severely degraded.

Static interconnections are typically provided between the PEs, memory, and external I/O ports or devices. I/O is mapped to the PEs memories in a fixed or static map. This results in the need for the PEs to spend a portion of their execution time remapping/reformatting data which further lowers delivered performance.

FIG. 1 illustrates a modified data processor that was developed in an attempt to place multiple complex (32-bit) PEs on each processing chip. The chip was designed to process applications, such as image processing, that required a large amount of memory and memory bandwidth per PE. The standard single chip could not accommodate enough I/O pins to provide a direct memory interconnection for each PE with adequate bandwidth (32 bit wide memory patch for a 32 bit PE). FIG. 1 sought to overcome this limitation, without degrading the performance of the PE's, by implementing the memory capability external to the processor array 2 in a dual ported memory 4. The processor array 2 was an N×N array of individual PEs 6 arranged in N columns and N rows. For convenience the upper and lower edge rows 8 and 10 are respectively denoted north and south, while the right and left edge rows 12 and 14 are respectively denoted east and west. Interconnections were provided between the memory 4 and each of the N PEs of the north edge through N bidirectional connectors 16.

A multiplexer 18 had one input from the system bus 20 through an I/O port 22 and another input from the south PE edge 10 through N bidirectional connectors 24. The multiplexer output 26 was delivered as an input to memory 4.

The memory thus interfaced with the north and south edges of the processor array, but not with the east and west edges. N "wrap around" connectors 28 were provided between corresponding PEs on the east and west edges 12 and 14 to move data between these edges, but the lack of an interface between these edges and the memory increased the mapping difficulty of various data manipulation operations, such as matrix transpositions.

Outputs were provided to the system bus from only the north edge of the PE array, or from the memory 4, over an output line 30 that was controlled by a gate 32. The output from the north PE edge was also supplied to the memory via connection 16, and connected to provide a wrap-around input to the south edge via a tri-state buffer 36. The south edge could write to memory via path 24.

Ideally, the memory would have been able to communicate with each of the four processor array edges and with both I/Os simultaneously. However, the two ports of memory 4 were shared between input, output and the north and south array edges, with no direct connections to the east or west edges. Furthermore, only two of these connections could be active at any given time. The I/O and memory bandwidth were inadequate for most parallel signal and image processing algorithms, since only a single read or write memory access and a single read or write I/O access, or two memory accesses (one read and one write), could occur simultaneously.

SUMMARY OF THE INVENTION

The present invention seeks to provide a data processor that operates in a single instruction, multiple data mode with a very high performance in both systolic and cellular computations, has a flexible data transfer scheme with very high data rates, supports all the important configurations of multiple memories, I/O ports and the processor array without resorting to costly large cross-bar switches or multi-ported memories, and has a capability for multiple PEs on a single chip.

These goals are achieved with the use of single-ported memories arranged in separate memory channels and a controller that dynamically and selectably interconnects multiple edges of the processor array with the memories and with one or more I/O ports. There are typically N channels for an N×N processing array of PEs, but the invention is also applicable to different array geometries, both two and three-dimensional, and to other than a one-to-one correspondence between the number of channels and the number of edge PEs in the array. The controller is preferably implemented as a set of controller modules, one for each channel, with each controller module dynamically and selectably interconnecting a respective controller channel with the corresponding edge PEs of the north, south, east and west edges.

Each controller module preferably communicates directly with all four edge PEs of its respective PE column and row, and also with each I/O port. Each channel memory preferably consists of three single ported RAM memory stores, each of which is interconnected with all four edges of the processor array and with the I/O ports through their respective controller module. Supplying all four edges of the array from only three memory stores per channel, with the memory channels independent of each other, does not degrade performance for the great majority of algorithms.

The mutually independent controller modules preferably include sets of multiplexers that control the interconnections between the memory stores, array edges and I/O ports, and configuration registers that respond to instructions from a computer to dynamically establish the interconnections.

These and other features and advantages of the invention will be apparent to those skilled in the art from the following detailed description, taken together with the accompanying drawings.

BRIEF DESCRIPTION OF THE DRAWINGS

FIGS. 7, 8 and 9 are block diagrams of multiplexers employed in each controller module that control writing to and reading from the processor array, the memory stores and the I/O ports, respectively;

FIG. 11 is a block diagram of a configuration register employed in each of the controller modules.

DETAILED DESCRIPTION OF THE INVENTION

Figure 2:
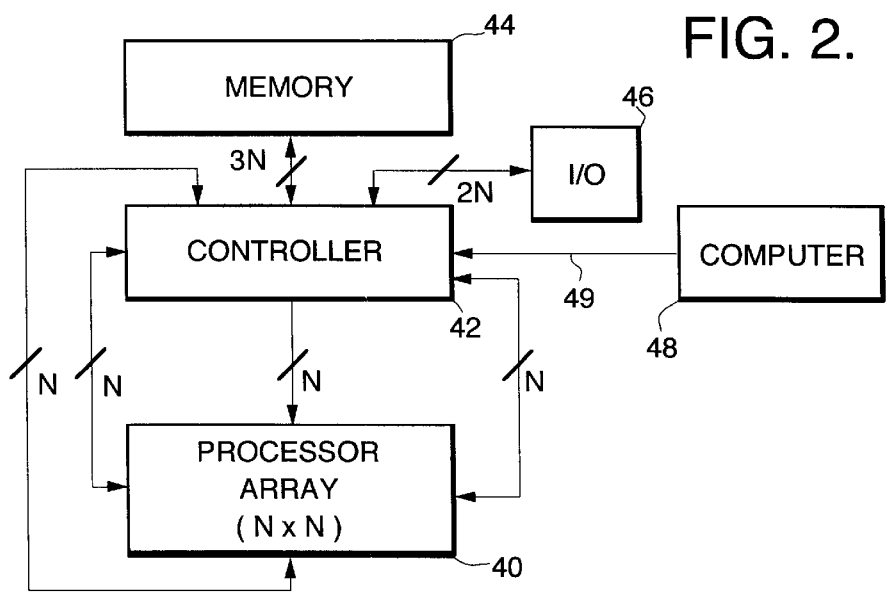
FIG. 2 is a simplified block diagram illustrating the basic principals of the invention.

The invention presents an architecture that dynamically interconnects a single processor array with external memory and I/O ports to produce a highly efficient operation that avoids extensive processor idle periods, can be implemented with multiple PEs on a single chip, and does so with a lower cost, lower power and lower volume memory system. The processor array 40 of FIG. 2 is shown as an N×N array. Although N is assumed below to be four for purposes of simplicity, in practice it will generally be considerably larger. A controller 42 provides dynamic and selectable interconnections between each edge of the array and the other edges, between each edge and a memory 44, between each edge and one or more I/O ports 46, and between the memory 44 and the I/O ports 46. A host computer 48 is connected via a Host Bus 49 to provide a path for task level command/control parameters and summary information. FIG. 2 only shows data-path information. An instruction sequencer sends instruction control information to each I/O controller and to each PE via unshown control-paths. The instructions, stored in a register described below, dynamically govern the interconnections established by the controller at successive clock increments.

Figure 3:
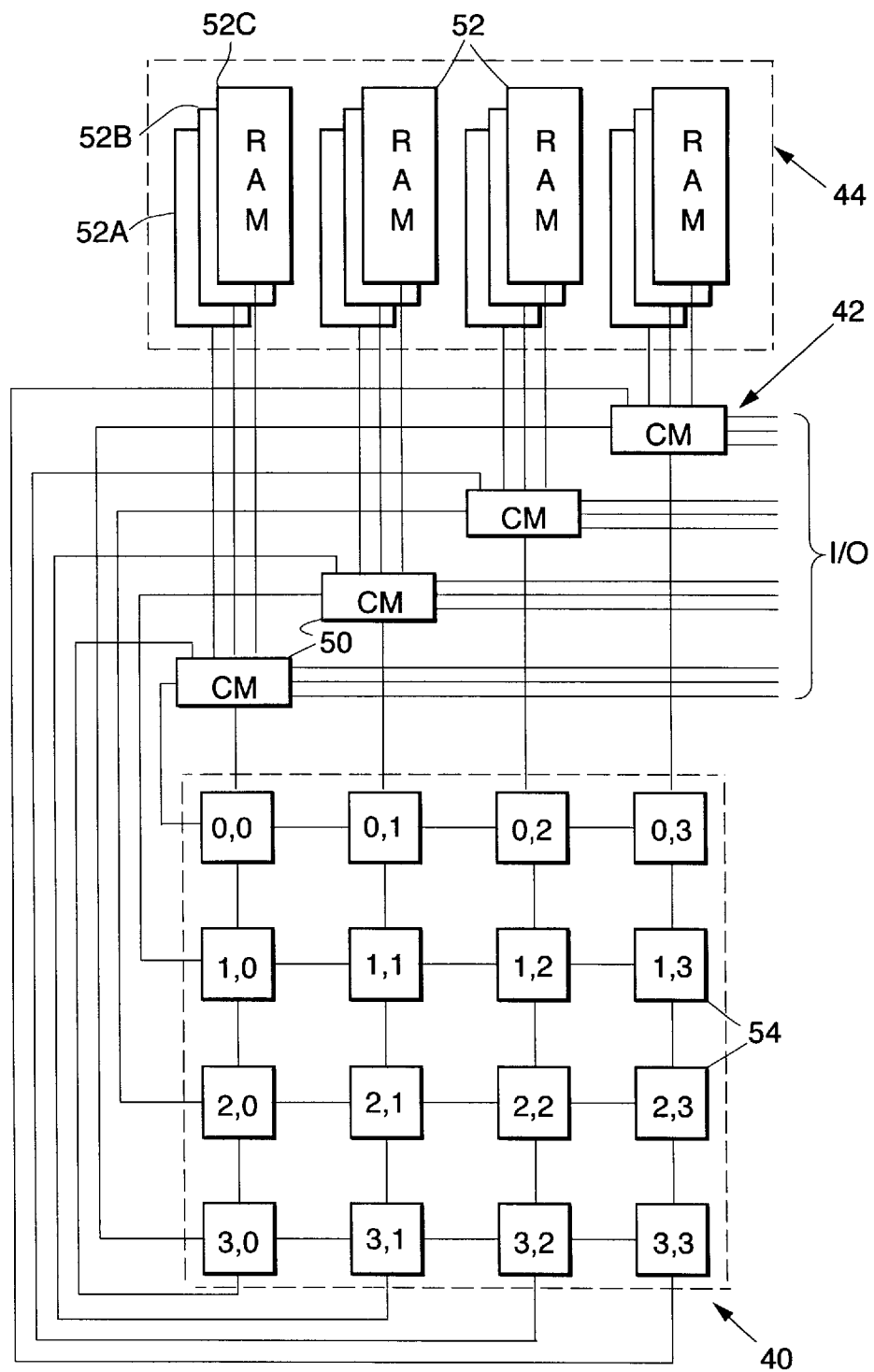
FIG. 3 is a block diagram showing interconnections between the processor array, controller modules, memory channels and I/O ports.

A preferred implementation of this general architecture is shown in FIG. 3. The controller 42 consists of N mutually independent controller modules 50, and the memory 44 is organized into N independent memory channels 52. The memory channels in turn each consist of a number of separate memory stores 52A, 52B and 52C, which are preferably RAMs. Each memory channel is independent of the other memory channels; there is no provision for directly interconnecting one memory channel with another.

Figure 1:
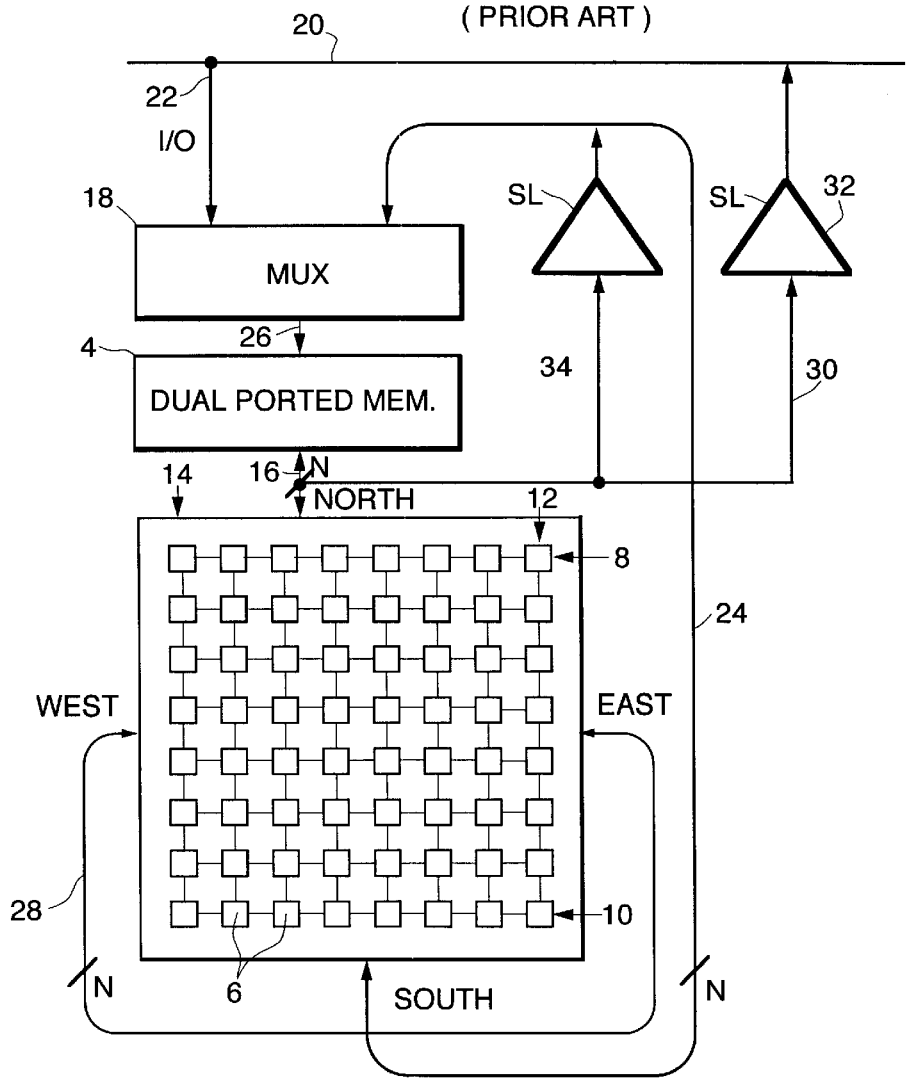
FIG. 1 is a block diagram of a prior interconnection scheme for an array processor, described above.

As with the processor array of FIG. 1, the processor array 40 consists of N columns and N rows of individual PEs 54. Each controller module 50 has selectable connections to associated row and column edge PE pair, with connections to the north and south edge PEs of the associated column and to the east and west edge PEs of the associated row. The controller modules 50 also provide selectable interconnections with each of the memory stores 52A–52C in the same channel, and with each of the I/O ports. Each controller module can interconnect any of the memory stores in the same channel with any of the four PEs or (for example) two I/O ports to which it is connected. It can also establish interconnections between any pair of its four associated edge PEs, and between any of its four edge PEs and either of the I/O ports. No provision is made for a connection of one memory store with another in either the same or a different channel, or of one I/O port with the other I/O port. For an N×N array of PE's each PE can be lexicographically indexed by its row and column index, PE(i,j), with indices ranging from 0 to N−1. An I/O controller module channel j, (CMj), is connected to the associated row and column edge PE pairs: PE(j,0) and PE(j,N−1), PE(0,j), and PE(N−1,j).

Although ideally four memory stores would be provided in each channel, one for each edge of the processor array, in practice this adds too many pins to the chip. It has been found that the great majority of algorithms can be efficiently performed with only three memory stores per channel by using the controller modules to dynamically reconfigure the data flows between the three memory stores and the four processor array edges. At each successive clock cycle the interconnections provided by the controller modules among their respective memory stores, PEs and the I/O ports can be reconfigured to make full use of the processing capacity. The invention is particularly applicable to image processing, various signal processing functions such as finite impulse response (FIR) filters, fast Fourier transforms, correlators and matrix inverters, linear algebra, and in general to data having data vector or array formats. The invention is not particularly suitable to algorithms in which single instruction, multiple data processes perform poorly, and to applications such as compilers and word processors that are heavily data dependent and have many branches.

The majority of algorithms, particularly those to which the invention in most applicable, have structured rather than random data that can be put into the correct memory channels so that it arrives at the proper processor array channels without lateral inter-channel transfers. However, if it is desired for some reason to access a memory in one channel with a PE in another channel, this can be done by accessing the memory with a PE in the same channel and then moving the data laterally within the array processor to the target channel.

The use of three memory stores per channel allows the channel memory to be connected to three edges of the processor array simultaneously, which as discussed above can make full use of the processor capability through the use of the dynamic reconfiguration provided by the invention. Although theoretically only one memory store per channel could be used, in that case only one edge of the processor array could be addressed at a time and the data throughput would be significantly reduced. A somewhat greater throughput could be achieved with two memory stores per channel, but it would still be significantly less than with three memory stores. Given the invention's dynamic reconfiguration, any additional throughput that could be achieved by increasing the number of memory stores from three to four per channel would not be significant for the great majority of algorithms.

With the invention as illustrated generally in FIG. 3, the total number of memory pins increases linearly with N. This contrasts with prior processors having memory imbedded in the PEs, in which the number of pins increase with $N^2$. If there are M PEs per chip, this results in the number of pins being proportional to $\sqrt{m}$ rather than M. This large reduction in the total number of pins allows multiple PEs to be fabricated on a single chip.

Figure 4:
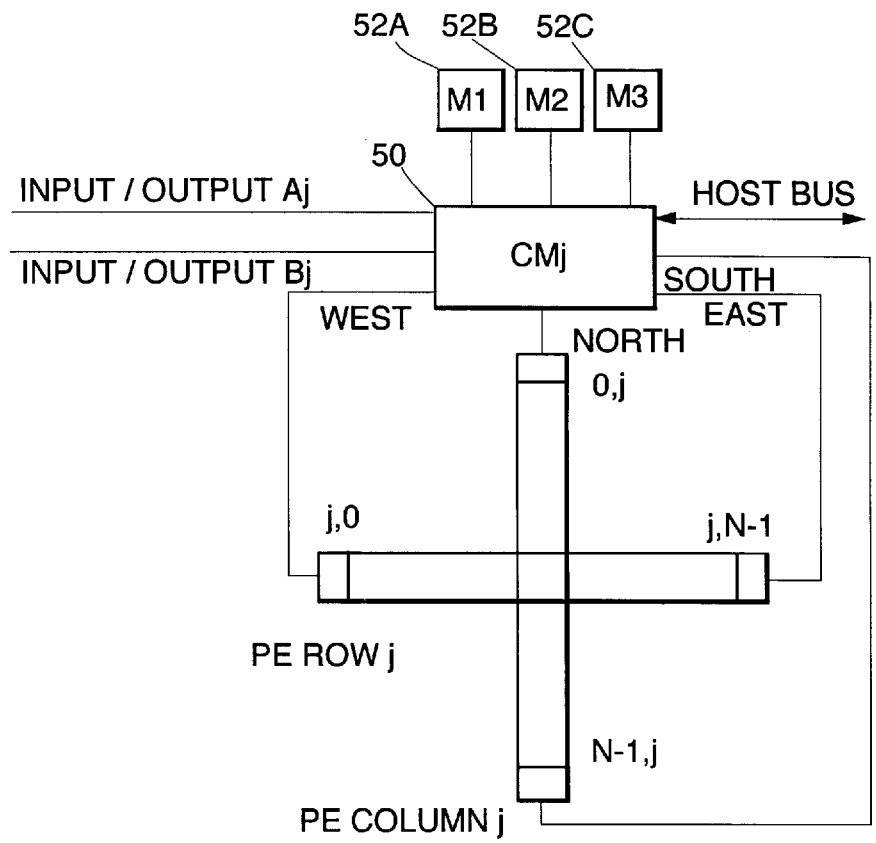
FIG. 4 is a block diagram illustrating a permissible set of interconnections for an individual controller module with an N×N PE array, with the number of controller modules also equal to N.

The data paths associated with each controller module 50 are illustrated in FIG. 4. For a controller module (CMj) associated with channel j, there are interconnects to the north and south edge PEs for column j in the processor array, to the east and west edge PEs for row j in the PE array, to each of the memory stores 52A, 52B, 52C in channel j, and to the I/O ports $A_j$ and $B_j$. The host computer has DMA access to the memories via the Host Bus.

FIG. 4 illustrates the case of an N×N processor array, with the number of controller modules likewise equal to N. The invention also applies to M×N rectangular arrays in which the number of controller modules can be equal to M, N or some other number P, to arrays in which a controller module connects to edge PEs in different rows or columns at opposite sides of the PE array, and to non-rectangular arrays.

Figure 5:
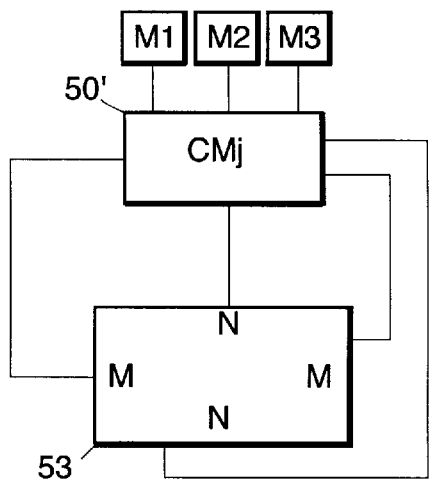
FIG. 5 is a block diagram illustrating a permissible set of interconnections for an individual controller module with an M×N PE array.

In FIG. 5 a controller module 50' is shown interconnected to the edges of an M×N PE array 53, in which the number of rows M is less than the number of columns N. The controller module does not have to connect with each PE row and column. For example, if N=2M, there can be a controller module for every row but only for every other column; the output edge of a column to which no controller module is connected could wrap around to the input edge of another column which does have a connection to a controller module. Furthermore, as illustrated in FIG. 5, there is no requirement that a given controller module connect to the same row or column at the opposite edges of the PE array. For example, if a controller module connects to the j row at the west edge of the array and the 2j column at the north edge, it could connect to the j−1 row at the east edge and the 2j−2 column at the south edge.

Figure 6:
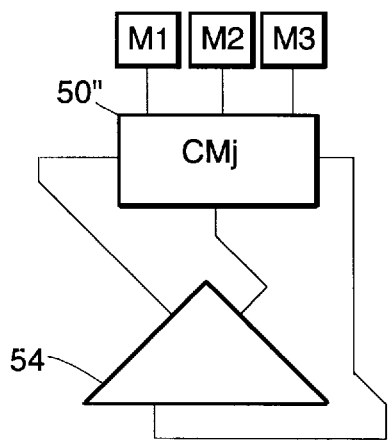
FIG. 6 is a block diagram illustrating a permissible set of interconnections for an individual controller module with a triangle PE array.

FIG. 6 illustrates the case of a non-rectangular array. Specifically, a triangular array 54 is shown, with a given controller module 50" connecting to respective edge PEs on the three edges of the array. Again, there is no requirement that the connections be symmetrical, or that the different edges of the array have equal numbers of PEs. The invention is also applicable to three-dimensional as well as two-dimensional arrays.

Figure 7:
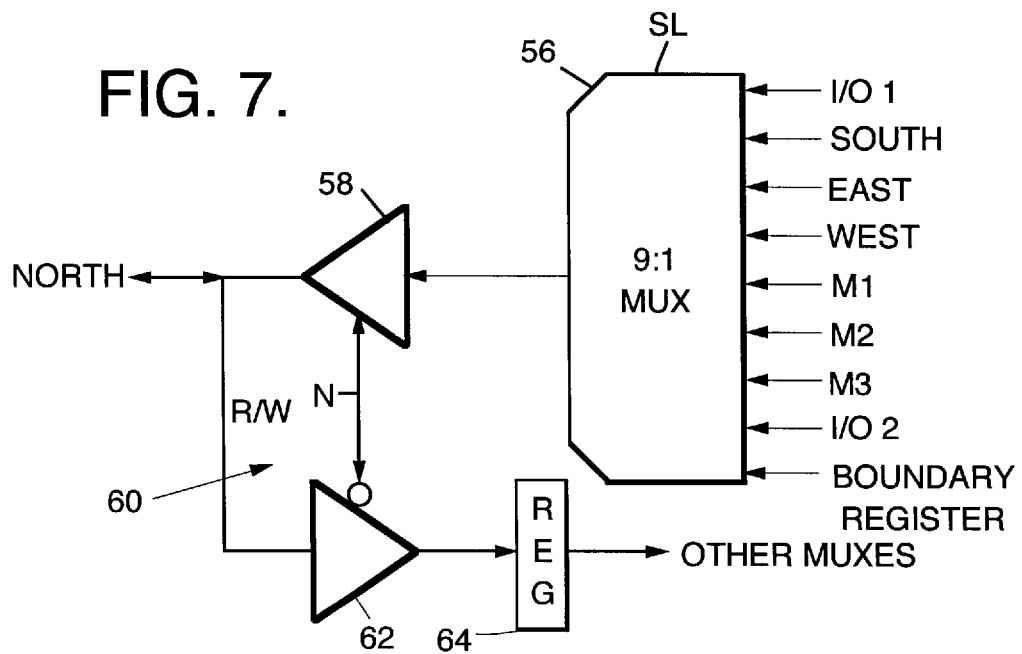

Each controller module includes various multiplexers that govern the interconnects at any particular clock period. One set of four multiplexers provides for write/read addressing of the controller module's associated north, south, east and west edge PEs. The multiplexer 56 for the north edge PE is illustrated in FIG. 7; similar multiplexers would be provided for each of the other edges. It is a 9:1 multiplexer that receives inputs from each of the memory stores (M1, M2, M3) for that channel, from each of the three other edge PEs (south, east and west) associated with the same controller module, from the two I/O ports, and from a boundary register described below. It provides an output to one gate 58 of a tri-state switch 60, the other gate 62 of which has an inverted switching state from gate 58. The output of gate 58 writes to the north edge PE from whichever one of the multiplexer's inputs is enabled by a select (SL) input. If the north PE is to be read rather than written to, a read/write (R/W) control to the tri-state switch 60 enables gate 62 and disables gate 58, allowing the north PE data to be read out through a register 64. This readout provides an input to the other multiplexers for the same controller module. Similar multiplexers are provided for each of the three other edge PEs.

FIG. 8 shows a multiplexer 66 used for one of the memory stores M1; similar multiplexers are provided for the other memory stores M2 and M3. It is again an 9:1 multiplexer, with inputs from each of the four north, south, east and west edge PEs associated with the channel, the two I/O ports, the Host Bus, a PUSH BUS which is an internal bus that allows the controller modules interconnection configuration to be stored in one of the three memory stores to save the state for subroutines and interrupts, and the boundary register. The multiplexer output, as determined by the SL input, is fed through a register 68 for clock synchronization to one gate 70 of a tri-state buffer 72, the other gate 74 of which has an inverted switching state from gate 70. The output of gate 70 writes data into memory store M1, while data read out from M1 is transmitted through gate 74 and another synchronizing register 76 to provide inputs to the other multiplexers.

Each I/O port receives data from an associated multiplexer 78 illustrated in FIG. 9. This is a 7:1 multiplexer, with inputs from the north, south, east and west edge PEs for the same channel through their respective multiplexers, and from each of the three channel memory stores through the memory store multiplexers. Similar to the memory stores, no direct I/O-to-I/O communication is provided for.

Figure 10:
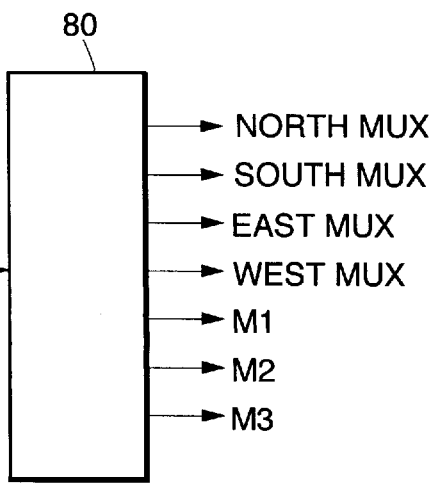
FIG. 10 is a block diagram of a boundary register that provides inputs to the multiplexers of FIGS. 7 and 8.

The boundary register 80, illustrated in FIG. 10, stores a programmable value. The typical values are (0, 0.0, NaN, and −∞), where NaN and −∞ are special floating point values defined in The IEEE-754 standard. All memory (M1, M2 and M3) and processors array inputs (north, south, east and west) must have a defined input. If no other input is configured, it defaults to the value in the boundary register.

A typical use for the boundary register would be an algorithm in which data is flowed south from M1 through the processor array to load a set of data values in each PE, followed by systolic processing, with data flowing east after each processing step. The boundary register is connected to the west edge and loaded with the value NaN to differentiate true data and the boundary of the data set.

Each of the controller modules includes a respective configuration register 82, illustrated in FIG. 11, that receives an instruction from the host computer via the Host Bus and controls the operation of the various multiplexers for that controller module. Instruction words for the preferred embodiment of the processor as a whole are 128 bits long, of which 24 bits are used for the controller module instruction, whose configuration can be stored in register 80 (two of the instruction bits are used to update the register and are not themselves stored in the register, which is thus a 22 bit device for this particular implementation). Since the processor operates in a single instruction, multiple data mode, the instruction registers for each channel receive the same configuration instructions.

Each of the memory stores M1, M2 and M3 are allocated two bits of the configuration register for writing to the memory stores. These bits are encoded separately for each memory store to indicate either:
1) Reserved;
2) Data to be obtained from the north-south axis;
3) Data to be obtained from the east-west axis;
4) Nothing to be written.

Data is typically written into the north edge of the processor array and read out from the south edge, and moved laterally from east to west. An instruction to read from the north-south axis thus causes data from the south edge PE of the controller module's associated processor array column to be written to the memory store, while an instruction to read data from the EW axis causes the data to be taken from the west edge.

Each I/O port is allocated three configuration bits, plus a directional d bit that determines whether the data is to be taken from or supplied to the I/O port. The connections controlled by the three bits for each I/O port are:

1) Reserved;
2) North-south axis;
3) East-west axis;
4) Memory store M1;
5) Memory store M2;
6) Memory store M3;
7) No connection.

Interconnections with the north-south and east-west axes are controlled by three instruction bits each, plus a directional d instruction bit that determines whether the array processor axis is to be written to or read out from. Separate enable bits are typically provided in the host computer instruction for these two fields, but are not stored in the register itself. The three-bit north-south and east-west codes preferably provide for the following:

1) Reserved;
2) Output of the north-south axis;
3) Output of the east-west axis;
4) Memory store M1;
5) Memory store M2;
6) Memory store M3;
7) No connections.

Each controller module also includes address registers that set the memory addresses to be written to or read from. These registers are loaded by another portion of the overall instruction word from the host computer. Unlike the configuration register illustrated in FIG. 11, in which the registers for each controller module receive identical instructions, the memory address registers for the different controller modules can effectively receive different address instructions through the masking of instructions.

The memory stores M1, M2, M3 are single port and only allow one access per clock, which can be either a read or a write operation. It is possible that there may be several contending requests for a memory access on a given clock. Requests could be from 1) an instruction that implies a read (e.g. Memory 1 is the writer of the northsouth axis), 2) an instruction that implies a write (e.g. Memory 1 is written to by data from the east-west axis), 3) an instruction that specifies a stack (push) write, 4) an I/O Port A read or write, 5) an I/O Port B read or write, and 6) a Host Bus read or write.

By rule, only one instruction type access is allowed per clock; otherwise there is an error condition. Configuring a memory for both an implied instruction read and write is prohibited an invalid configuration. All of the non-instruction types of memory access can be delayed until a memory access is available. This is handled by an arbitration decoder that analyzes the pending requests and then grants access to the highest priority request.

The following arbitration scheme, which lists the access requests in descending order of priority, is preferred:

Instruction Decode (Implied Read, Implied Write or Stack; only one of these can occur during an instruction).
I/O port A or B write-input buffer almost full.
Host Bus elevated.
I/O port A or B read or write.
Host Bus normal.

Instructions cannot wait and always have the highest priority. If the input buffer of an I/O port is almost full, that is the next highest priority to minimize the risk of loss of data. The Host Bus is normally the lowest priority, but if it fails to obtain access after a programmable number of attempts (default is 256) its priority is elevated for one access.

When there is more than one I/O port request for either almost full or normal read write, the requests are sub-prioritized by a "round-robin" arbitration. This means they take turns; Port A, Port B, Port A, etc. The arbitrated selection of a pending access request is combined with information stored in a configuration register to generate, through simple combinatorial logic, the necessary select and control signals for the multiplexers and tristate buffers shown in FIGS. 7, 8 and 9.

While a particular embodiment of the invention has been shown and described, numerous variations and alternate embodiments will occur to those skilled in the art. Such variations and alternate embodiments are contemplated, and can be made without departing from the spirit and scope of the invention as defined in the appended claims.

We claim:

1. A single instruction, multiple data mode data processor, comprising:
    a multiple-edge processor array,
    a memory that is external to said processor array,
    an input/output (I/O) port, and
    a controller connected to dynamically and selectably interconnect multiple edges of said processor array with said memory and with said I/O port, wherein said controller comprises a plurality of independent controller channels, said memory is configured in a plurality of independent memory channels, wherein each of said memory channels comprises three single ported RAM memory stores, that correspond to respective controller channels, and said processor array comprises an array of processor element (PE) rows and columns with each controller channel controlling respective edge PEs in an associated PE row and respective edge PEs in an associated PE column, said controller channels dynamically and selectable interconnecting their respective edge PEs with their corresponding memory store in their corresponding memory channel and with said I/O port, and said controller further comprises a plurality of multiplexers that directionally and respectively interconnect (a) selectable edge PEs of said processor array with selectable memory channels and said I/O port, (b) selectable memory channels with selectable edge PEs of said processor array and with said I/O port, and (c) said I/O port with selectable edge PEs of said Processor array and with selectable memory channels, providing for multiple dimension of interconnect between processor array and memory.

2. The data processor of claim 1, wherein said processor array has four edges, said memory channels each include three memory stores, and said controller channels dynamically and selectably interconnect respective PEs in each of the four processor array edges with each of the memory stores in their corresponding memory channel.

3. The data processor of claim 1, wherein said controller also dynamically and selectably interconnects said memory with said I/O port.

4. The data processor of claim 1, further comprising a computer that generates instructions for said controller and a configuration register that interfaces between said computer and said controller.

5. The data processor of claim 1, wherein said memory is organized in multiple channels, and said controller comprises a plurality of controller modules, one for each channel.

6. The data processor of claim 1, further comprising at least one additional I/O port, with said controller connected to dynamically and selectably interconnect multiple edges of said processor array with said memory and with each of said I/O ports.

7. The data processor of claim 1, wherein said controller channels comprise controller modules, with each controller module dynamically and selectably interconnecting its respective edge PEs in said array with its corresponding memory channel and with said I/O port.

8. The data processor of claim 7, wherein each of said memory channels comprises a plurality of memory stores, and each of said controller modules dynamically and selectably interconnects its respective edge PEs with each memory store in its corresponding memory channel.

9. The data processor of claim 6, wherein said processor array has four edges, said memory channels each include three memory stores, and each of said controller modules dynamically and selectably interconnects its respective edge PEs with each of the three memory stores in its corresponding memory channel.

10. A single instruction, multiple data mode data processor, comprising:

an M×N processor element array with a number of columns and a number of rows of processing elements (PEs), one of said numbers being equal to M and the other of said numbers being equal to N, wherein each PE column includes north and south edge PEs and each PE row includes east and west edge PEs, P memory channels, wherein each memory channel comprises three single ported random access memories (RAMs) respective memory stores, at least one input/output (I/O) port, and P controller modules, each comprising respective pluralities of multiplexers, each dynamically and selectably interconnecting respective edge PEs of said columns and rows with a respective memory channel and with said I/O ports, wherein each of said controller modules dynamically and selectable interconnects the north, south, east and west edge PEs of a respective PE column and row pair with its respective memory channel and with said I/O port, and wherein said controller modules dynamically and selectable interconnect the north, south, east and west edge PEs of their respective PE column and row pairs with each of the memory stores in their respective memory channels and with said I/O port, and further wherein the multiplexers for each controller module includes north, south, east and west edge multiplexers which provide outputs respectively to the north, south, east and west edge PEs of their respective PE column and row pairs, and which multiplex inputs from (a) the other edge PEs of their respective PE column and row pairs, (b) each of the memory stores for their respective controller modules, and (c) said I/O ports, wherein the north, south, east and west edge multiplexers for each controller module include a readout part from their respective edge PE to the other multiplexers of said controller module, and a selector for selecting between writing into said edge PE from said multiplexer and reading out from said edge PE, providing for multiple dimension of interconnect between the processor element array and the memory channels.

11. The data processor of claim 10, further comprising a programmable boundary register for storing a default value for said edge PEs, said boundary register connected as an additional input to said multiplexes.

12. The data processor of claim 10, further comprising a programmable boundary register for storing a default value for said memory stores, and said boundary register connected as an additional input to said multiplexers.

13. The data processor of claim 10, wherein said memory channels are independent of each other and are not interconnected by said controller modules.

14. The data processor of claim 10, where in M=N.

15. The data processor of claim 10, wherein M=P.

16. The data processor of claim 15, wherein M=N=P.

17. A single instruction, multiple data mode data processor, comprising:

an M×N processor element array with a number of columns and a number of rows of processing elements (PEs), one of said numbers being equal to M and the other of said numbers being equal to N, wherein each PE column includes north and south edge PEs and each PE row includes ease and west edge PEs, P memory channels, wherein each memory channel comprises three single ported random access memories (RAMs) respective memory stores, at least one input/output (I/O) port, and P controller modules, each comprising respective pluralities of multiplexers, each dynamically and selectably interconnecting respective edge PEs of said columns and rows with a respective memory channel and with said I/O ports, wherein each of said controller modules dynamically and selectably interconnects the north, south, east and west edge PEs of a respective PE column and row pair with its respective memory channel and with said I/O port, and wherein said controller modules dynamically and selectably interconnect the north, south, east and west edge PEs of their respective PE column and row pairs with each of the memory stores in their respective memory channels and with said I/O port, and further wherein the multiplexers for each controller module includes memory store multiplexers which provide respective outputs to the memory stores for said controller module, and which multiplex inputs from (a) each of the edge PEs of the controller modules' respective PE column and row pairs, (b) the other memory stores for said controller module, and (c) said I/O ports, wherein the memory store multiplexers for each controller module includes a readout path from their respective memory stores to the other multiplexers of said controller module and a selector for selecting between writing into said memory store from said multiplexer and reading out from said memory store, providing for multiple dimension of interconnect between processor element array and memory channels.

18. The data processor of claim 17, further comprising a programmable boundary register for storing a default value for said memory stores, and said boundary register connected as an additional input to said multiplexers.

19. The data processor of claim 17, wherein said memory channels are independent of each other and are not interconnected by said controller modules.

20. The data processor of claim 17, wherein M=N.

21. The data processor of claim 17, wherein M=P.

22. The data processor of claim 21, wherein M=N=P.

* * * * *